United States Patent
Winslow

(10) Patent No.: US 9,108,731 B2
(45) Date of Patent: Aug. 18, 2015

(54) REPAIRABLE LANYARD RELEASE CONNECTOR

(75) Inventor: Christopher C. Winslow, St. Peters, MO (US)

(73) Assignee: THE BOEING COMPANY, Chicago, IL (US)

(*) Notice: Subject to any disclaimer, the term of this patent is extended or adjusted under 35 U.S.C. 154(b) by 2520 days.

(21) Appl. No.: 11/612,390

(22) Filed: Dec. 18, 2006

(65) Prior Publication Data

US 2008/0145142 A1 Jun. 19, 2008

(51) Int. Cl.
- B25G 3/18 (2006.01)
- F16B 21/00 (2006.01)
- F16D 1/00 (2006.01)
- B64D 1/02 (2006.01)

(52) U.S. Cl.
CPC .............. B64D 1/02 (2013.01); Y10T 403/591 (2015.01)

(58) Field of Classification Search
CPC .............................. Y10T 403/591; B64D 1/02
USPC ........ 403/301, 307, 315, 322.1, 343, 78, 341, 403/348, 350; 267/159–161, 163; 439/321, 439/639, 255; 81/176.1, 176.2, 176.15, 81/485, 486
See application file for complete search history.

(56) References Cited

U.S. PATENT DOCUMENTS

| | | | | |
|---|---|---|---|---|
| 3,133,740 A * | 5/1964 | Drantz | .......................... | 279/4.03 |
| 3,382,688 A * | 5/1968 | Wellekens | ...................... | 70/208 |
| 3,452,316 A * | 6/1969 | Mocek et al. | ................. | 439/255 |
| 3,946,182 A * | 3/1976 | Holder | .......................... | 200/517 |
| 4,093,529 A * | 6/1978 | Strobach | .................. | 204/196.11 |
| 4,208,082 A * | 6/1980 | Davies et al. | ................. | 439/255 |
| 4,247,216 A * | 1/1981 | Pansini | ...................... | 403/109.3 |
| 4,279,458 A * | 7/1981 | Knapp | .......................... | 439/255 |
| 4,364,615 A * | 12/1982 | Euler | ............................ | 384/517 |
| 4,542,852 A * | 9/1985 | Orth et al. | ................... | 236/92 B |
| 4,605,271 A * | 8/1986 | Burns | .......................... | 439/160 |
| 4,618,198 A * | 10/1986 | Dale et al. | ..................... | 439/281 |
| 4,632,480 A * | 12/1986 | Carpenter | .................... | 439/255 |
| 4,836,065 A * | 6/1989 | Setliff | .......................... | 81/124.2 |
| 4,892,432 A * | 1/1990 | Cooper | .......................... | 403/297 |
| 5,069,324 A * | 12/1991 | Lepage et al. | ................ | 194/212 |
| 5,600,870 A * | 2/1997 | Fields et al. | .................... | 16/342 |
| 5,640,922 A * | 6/1997 | Feldkamp et al. | ............ | 114/315 |
| 5,653,605 A * | 8/1997 | Woehl et al. | .................. | 439/321 |
| 6,056,599 A * | 5/2000 | Flickinger et al. | ............ | 439/598 |
| 6,554,523 B2 * | 4/2003 | Aday et al. | ...................... | 403/31 |
| 6,575,804 B1 * | 6/2003 | Primos | .......................... | 446/202 |
| 6,769,830 B1 * | 8/2004 | Nygren | ...................... | 403/322.1 |
| 7,526,983 B1 * | 5/2009 | Tipotsch | ..................... | 81/176.15 |

* cited by examiner

*Primary Examiner* — Daniel P Stodola
*Assistant Examiner* — Nahid Amiri
(74) *Attorney, Agent, or Firm* — Yee & Associates, P.C.

(57) ABSTRACT

A repairable lanyard release connector. The repairable connector includes a replaceable assembly with a housing that has a series of internal nested components, and a communications insert that is configured to nest within the housing. The communications insert includes a first structure for releasably engaging first cooperating structure of a first component of the series of internal nested components so that the communications insert and the first component rotate in concert when one is rotated. The communications insert also includes a second structure for releasably engaging second structure of a first component of the series of internal nested components to limit reciprocating motion of the communications insert in the replaceable assembly.

9 Claims, 15 Drawing Sheets

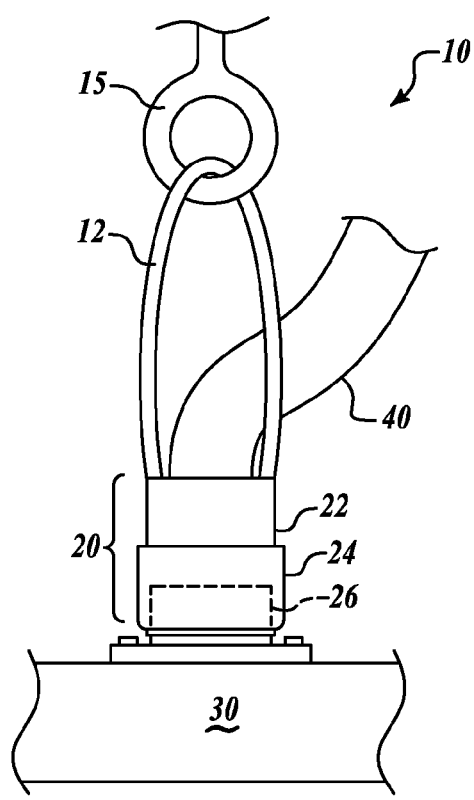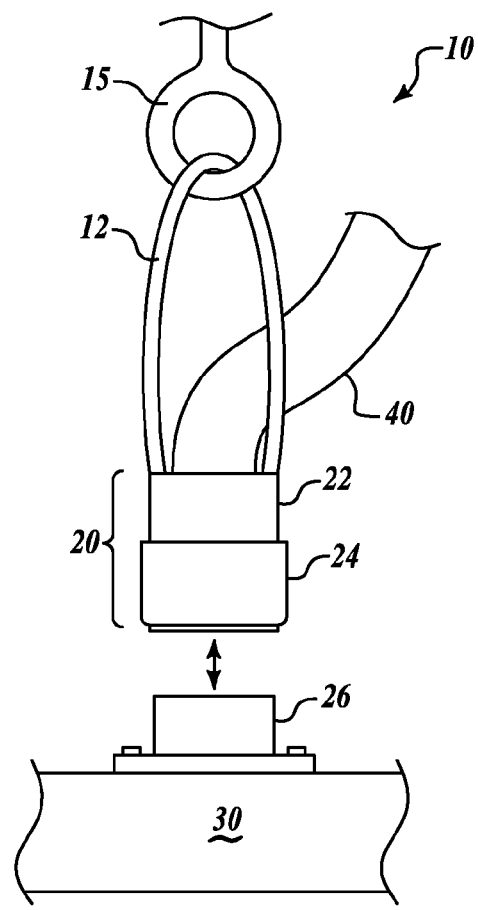
*FIG.1A*
(PRIOR ART)
*FIG.1B*
(PRIOR ART)

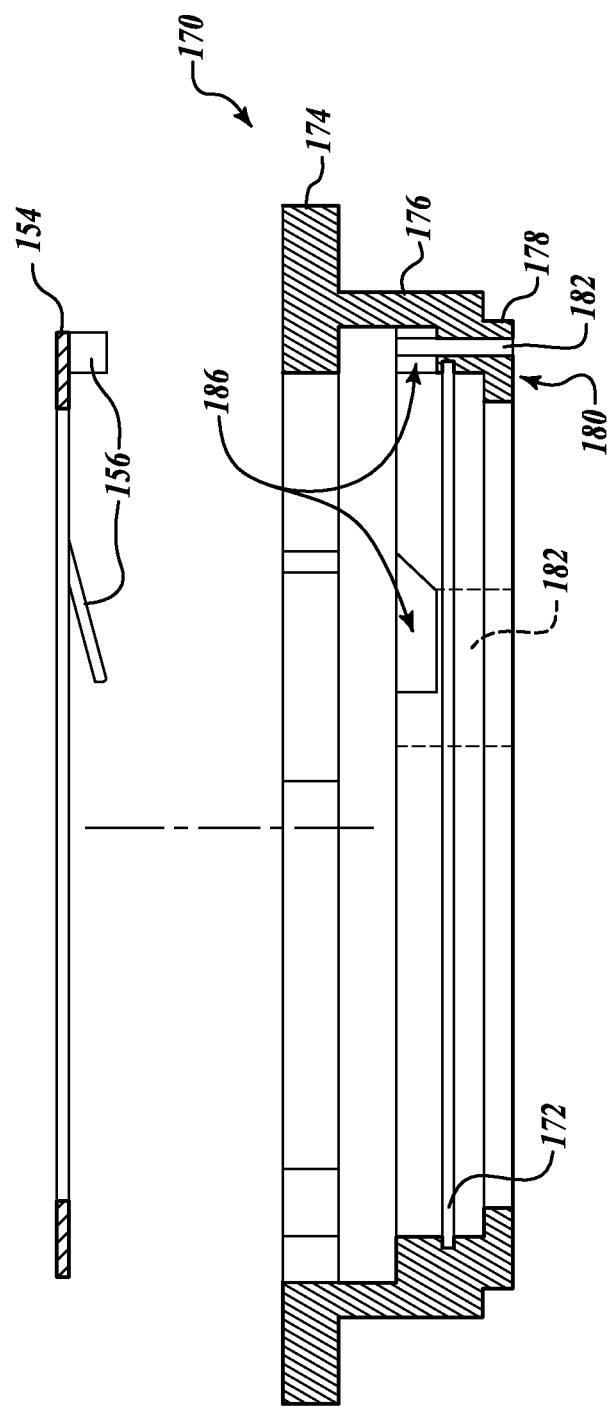

REPAIRABLE LANYARD RELEASE CONNECTOR

TECHNICAL FIELD

The embodiments described herein generally relate to mechanisms for releasing a payload from a vehicle, such as an aircraft, and more particularly relates to a repairable lanyard release connectors.

BACKGROUND

Vehicles, such as aircraft, may under certain circumstances carry a payload that must be released from the vehicle while it is in motion. For example, air drops of supplies or equipment in remote areas where aircraft landing may not be feasible or advisable. Some of the payloads may require electronic or other communication between the vehicle and the payload, before release of the payload. Typically, such communications may be effected by an "umbilical" which may comprise one or more communications lines between the vehicle and the payload. The umbilical must necessarily be severed in some manner when the payload is released. Accordingly, it is ordinary practice to utilize a lanyard to secure the umbilical in place during payload transport, and a lanyard release connector that separates the payload from the lanyard upon payload release.

An example of lanyard cable release assembly is shown in FIG. 1A, where a lanyard cable assembly 10 includes a cable 12 by which it is suspended from a support ring 15 of a portion of a vehicle, such as an aircraft underbody. The lanyard release connector 20 is substantially cylindrical and includes an upper portion 22 and a mated lower portion 24 that is mated to a receptacle 26 flanged to payload 30, which is suspended from the vehicle by releasable supports that are not shown. The upper portion 22 receives an umbilical 40 that may include a plurality of communications lines (not shown) that each communicate with its own communications channel (not shown) within upper portion 22. Lower portion 24 is releasably mated to the receptacle 26. When mated, upper portion 22 and lower portion 22 has communications channels that register with those contained in receptacle 26, when the portions are mated. When the payload 30 is released from its supports, as shown in FIG. 1B, the mass of the payload and associated release forces cause a separation between the lower lanyard release connector portion 24 and receptacle 26, which were releasably mated together. The forces acting on the lanyard release connector 20 that cause uncoupling of its portion 24 from the receptacle 26 during payload 30 release, may result in damage to the parts of the lower part connector 24. In present connector designs, the lower half of the connector 24 and the upper half of the connector 22 are integral and are not individually replaceable. Damage to the connector requires that the entire connector 20 be replaced. This requires that the umbilical cable assembly be disassembled, which is difficult and time consuming. The forces acting on the lanyard release connector 20 that cause uncoupling of lower portion 24 from receptacle 26 during payload 30 release, may result in damage to the lanyard. The removal and replacement in itself imposes costs and may result in downtime that would not otherwise have been necessary.

To date, the approach to addressing this problem in aircraft has focused on making the connectors more rugged. These efforts have had only marginal success because of the limits imposed by the rigid lanyard specification standards that must be met, as well as the limited space available in most installations for the lanyard connector. An example of such a lanyard release connector specification is MIL-DTL-38999/31D of Apr. 19, 2002, which supersedes MIL-C-38999/31C of Jun. 11, 2001, both of which are incorporated herein by reference. These factors severely limit the options available to connector designers to make connectors more rugged to withstand the forces acting upon the lanyard on payload release.

Accordingly, there is a need for a repairable lanyard release connector that can be re-used multiple times. In addition, it is desirable that components of the repairable lanyard release connector subject to forces that may cause damage during payload release be replaceable with relative ease. In addition it is desirable that the repairable lanyard release connector meet applicable product standards, in the case of aircraft lanyard release connectors. Furthermore, it is desirable that the lanyard release connector reduce the frequency of required repair or replacement of lanyard cable systems. Other desirable features and characteristics of the lanyard release connectors will become apparent from the subsequent detailed description and the appended claims, taken in conjunction with the accompanying drawings and the foregoing technical field and background. An important feature of this embodiment is that the connector can be repaired without the need to de-pin the umbilical cable from the upper portion of the connector.

BRIEF SUMMARY

An exemplary embodiment provides a repairable lanyard release connector. The repairable connector includes a replaceable assembly with a housing that has a series of internal nested components, and a communications insert that is configured to nest within the housing. The communications insert includes a first structure for releasably engaging first cooperating structure of a first component of the series of internal nested components so that the communications insert and the first component rotate in concert when one is rotated. The communications insert also includes a second structure for releasably engaging second structure of a first component of the series of internal nested components to limit reciprocating motion of the communications insert in the replaceable assembly.

In another exemplary embodiment, there is provided a repairable lanyard release connector that includes a replaceable connector assembly and a communications insert nested therein. The replaceable connector assembly includes a cylindrical housing. The housing surrounds at least a first nested component that has a key slot for receiving a key; and a second nested component mechanically coupled to the first nested component. The second nested component has at least one cavity. The communications insert is configured to nest within the housing and has key releasably engaging the key slot of the first nested component so that the insert and the first nested component rotate in concert when one is rotated. The communications insert also has at least one resilient prong releasably engaged in the at least one cavity of the second nested component. Further the communications insert has a projecting tooth configured to engage structure of the second component to limit or prevent reciprocating motion of the insert within the second component.

In addition, a releasable lanyard connector system is provided. An exemplary embodiment includes a replaceable lanyard connector assembly; and a communications insert configured to nest within the replaceable lanyard assembly. The system also includes an installation and removal tool configured to install and to remove the communications insert from the replaceable lanyard assembly

BRIEF DESCRIPTION OF THE DRAWINGS

Various embodiments will hereinafter be described in conjunction with the following drawing figures, wherein like numerals denote like elements, and FIG. 1A is an illustration of a prior art lanyard attached to a payload, with a communications umbilical attached for communication;

FIG. 1B is an illustration of the prior art lanyard of FIG. 1A, with payload released and the lanyard release connector separated;

FIG. 8D is a cross sectional view taken at 8D-8D of FIGS. 8B and 8C of the internal coupling ring of FIG. 8A and also illustrates a circular spring with prong to engage the internal coupling ring;

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Embodiments provide repairable lanyard release connectors that are configured to facilitate repair if damaged during payload release, or otherwise. Accordingly, the frequency of removal of a lanyard cable assembly from service for repair is either reduced substantially, or the need for such out-of-service removal for repair is eliminated. Exemplary embodiments include a replaceable lanyard release assembly that includes a series of nested components, and a removable communications insert that is readily replaced, if damaged. In certain embodiments, the installation and removal of the communications insert the repairable lanyard release connector may be facilitated by use of an installation and removal tool configured for these purposes. Accordingly, if repair is needed, the lanyard release connector is readily repaired in situ without need to remove the lanyard cable assembly from the vehicle for service.

Figure 2A:
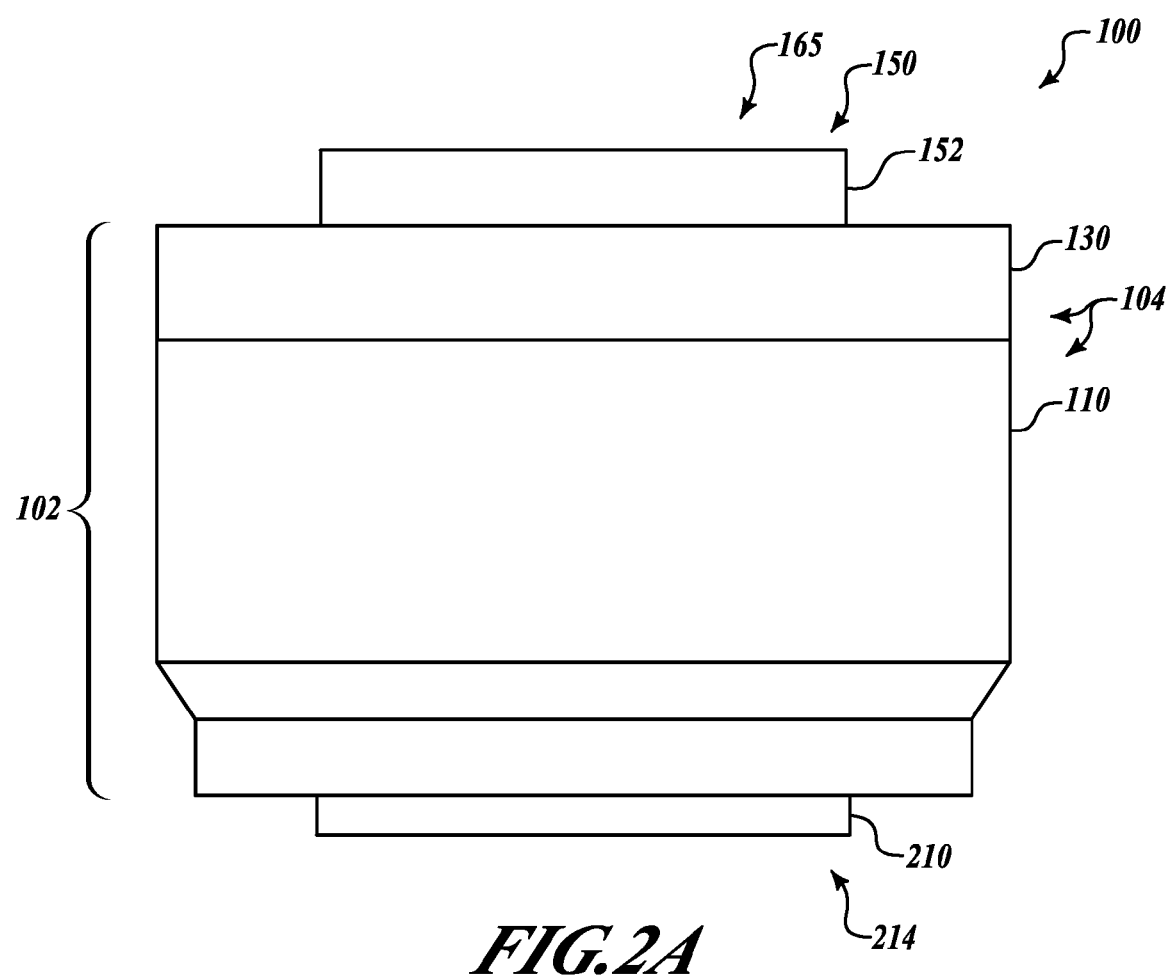
FIG. 2A is a side view of an exemplary embodiment of a lanyard release connector.
Figure 2B:
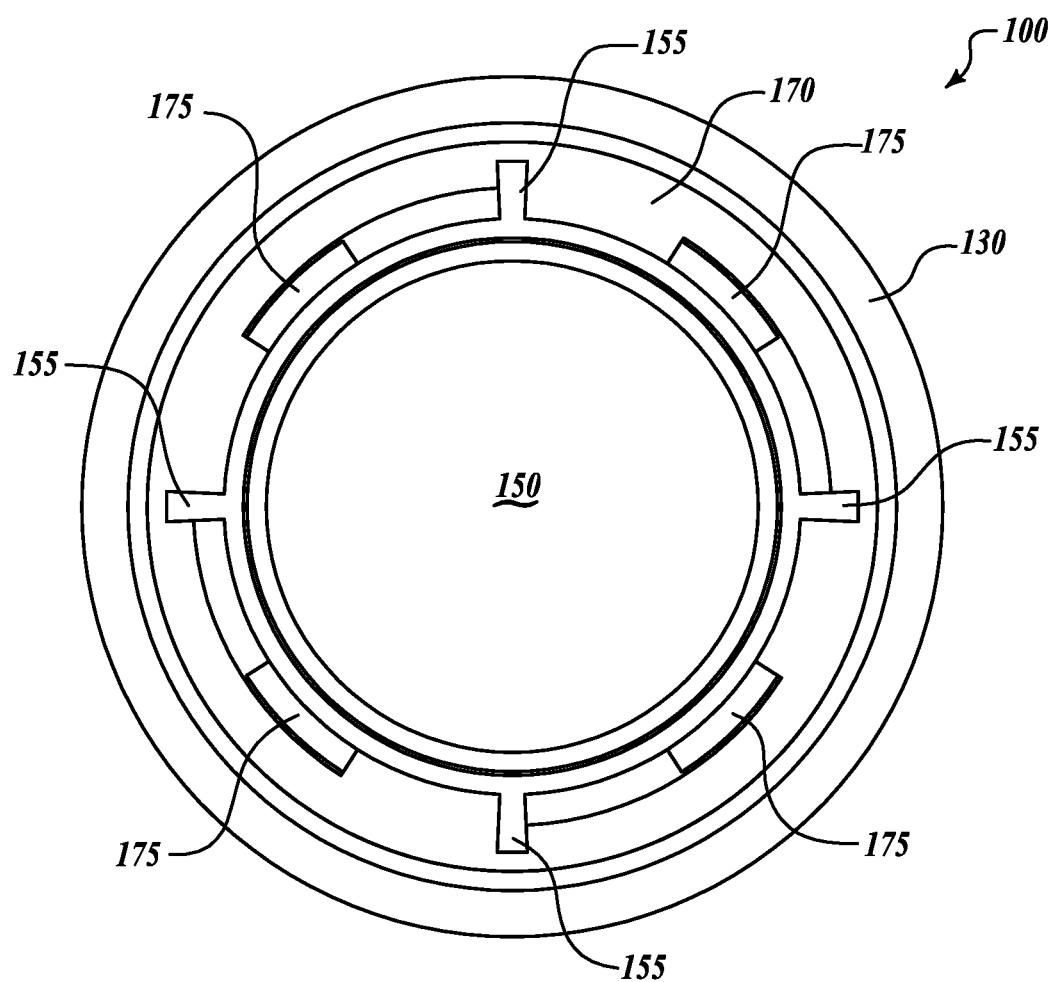
FIG. 2B is top view of the lanyard release connector of FIG. 2A.
Figure 2C:
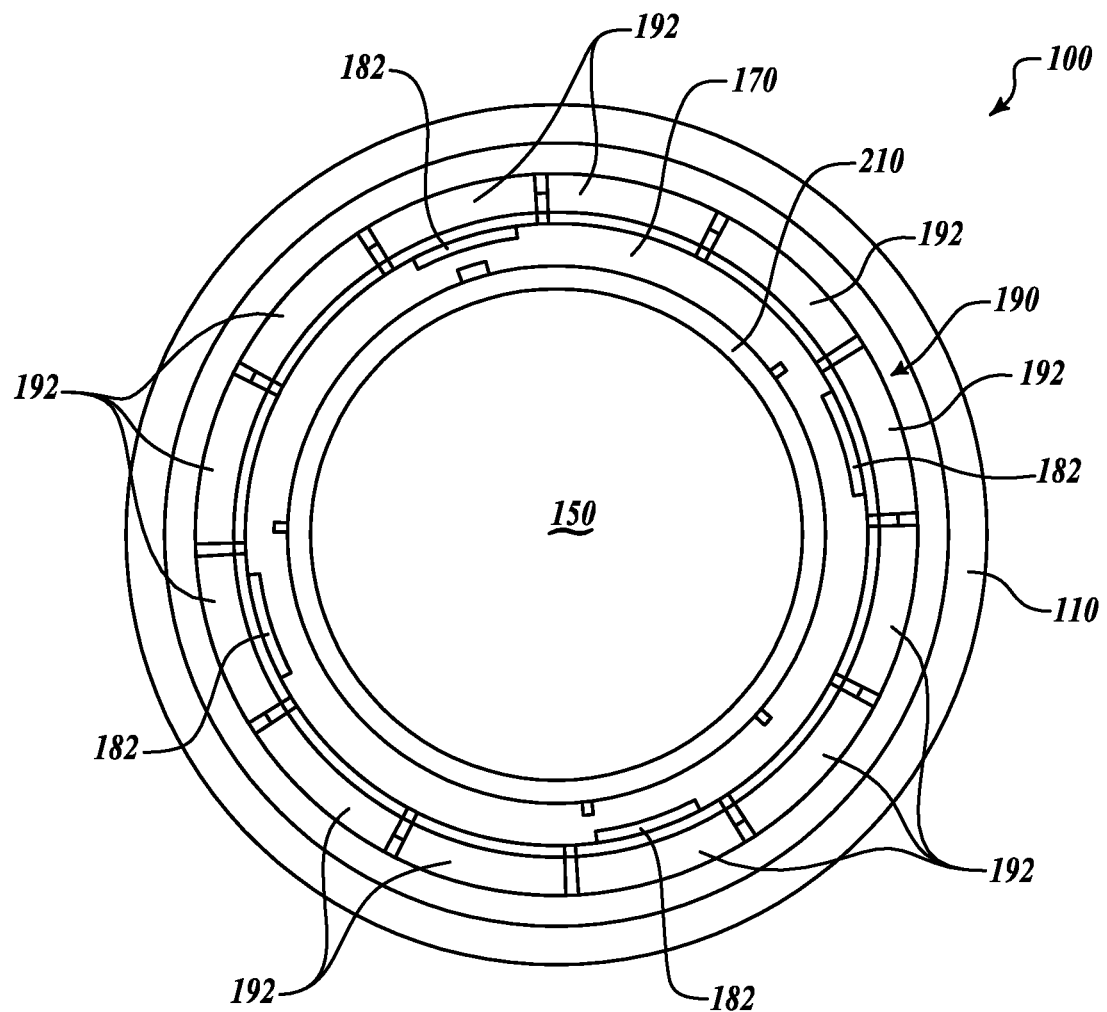
FIG. 2C is a bottom view of the lanyard release connector of FIG. 2A.
Figure 3:
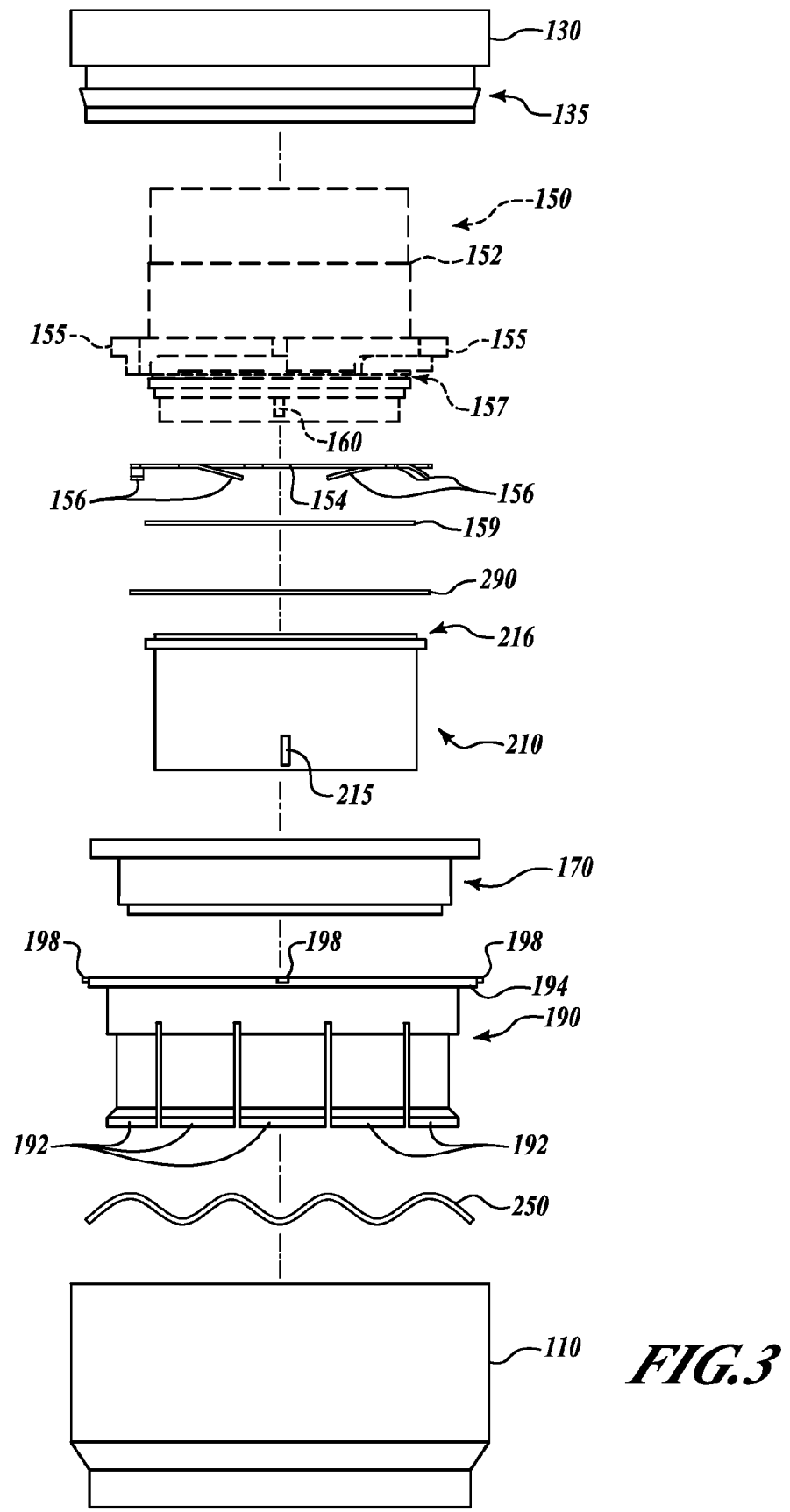
FIG. 3 is an exploded view of an exemplary embodiment of a lanyard release connector.
Figure 4:
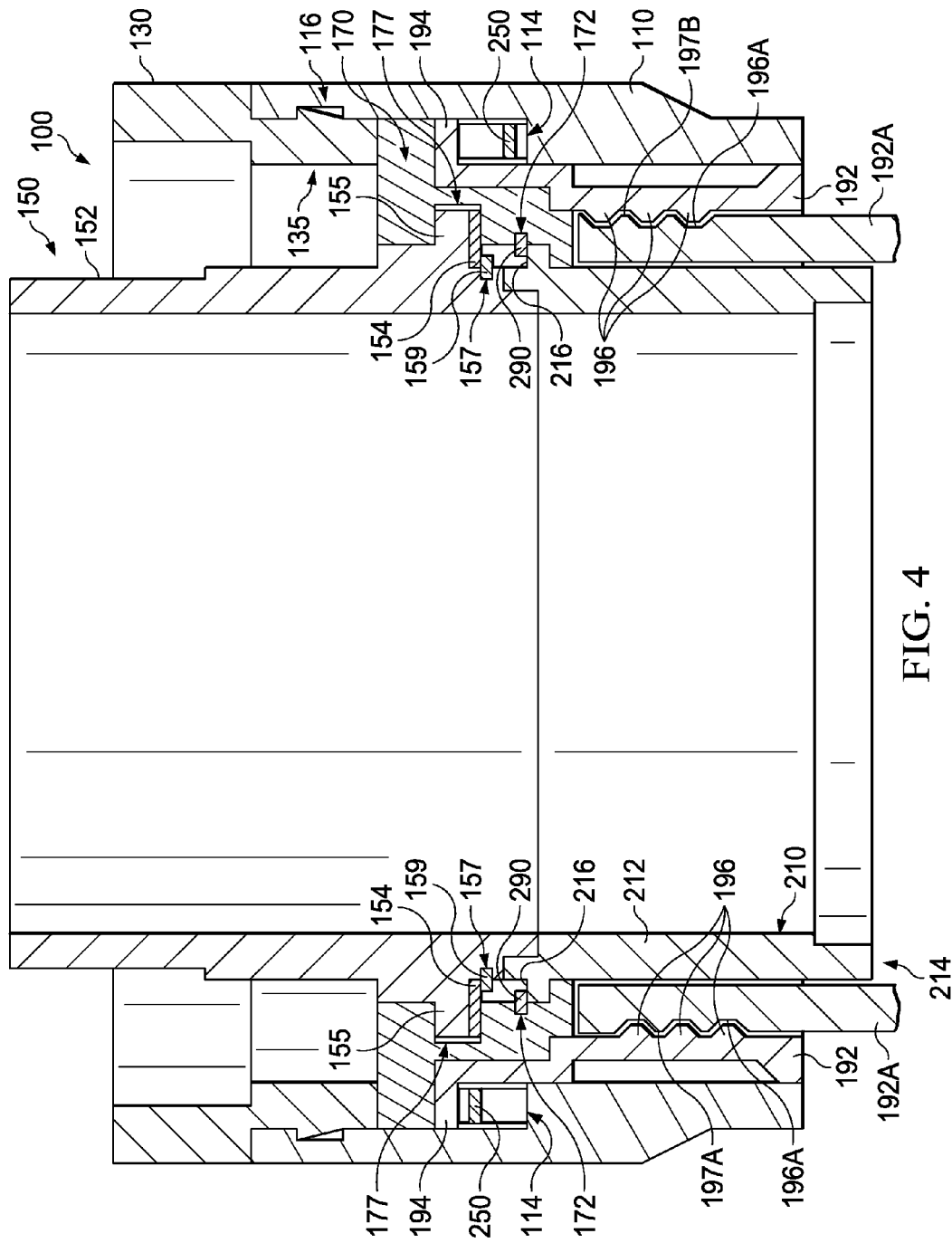
FIG. 4 is a cross sectional view of the embodiment of FIG. 2A.
Figure 5A:
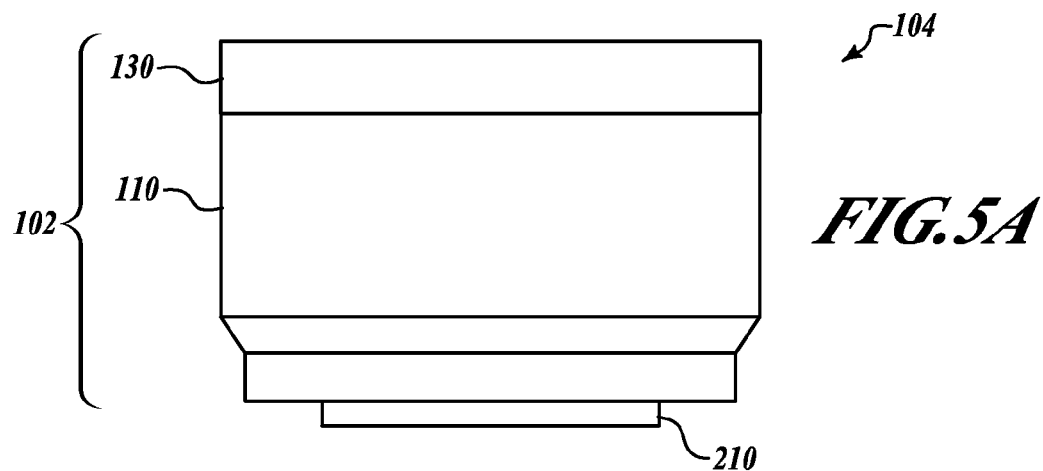
FIG. 5A is a side view of an exemplary embodiment of a replaceable lanyard release assembly.
Figure 5B:
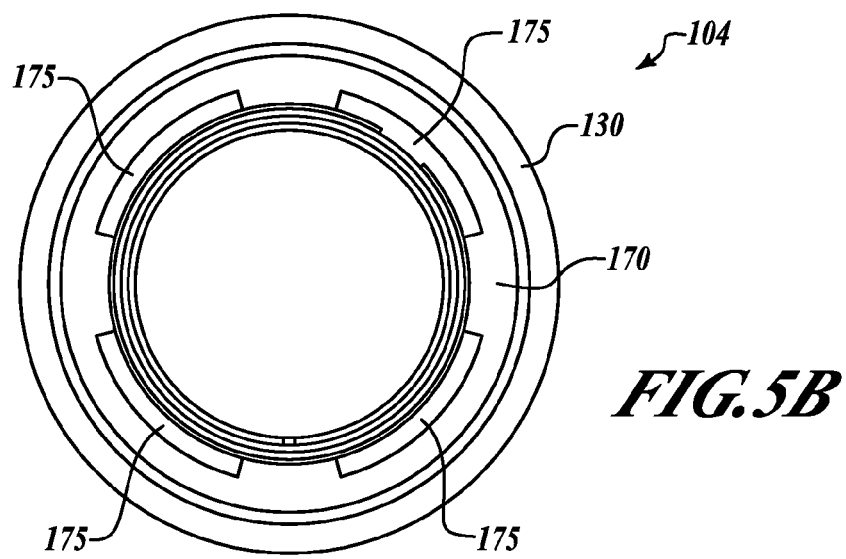
FIG. 5B is a top view of the replaceable lanyard release assembly of FIG. 5A.
Figure 5C:
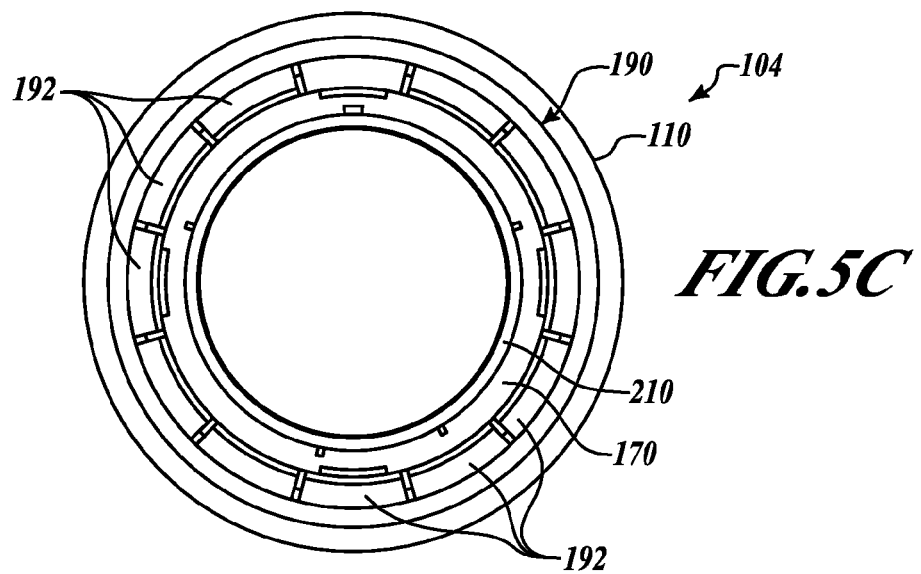
FIG. 5C is a bottom view of the replaceable lanyard release assembly of FIG. 5A.

An exemplary embodiment is illustrated in FIGS. 2A, B, and C, while an exploded view is illustrated in FIG. 3, and a cross sectional view of the assembled repairable lanyard release connector is illustrated in FIG. 4. The repairable lanyard release connector 100 has a housing 102 that contains a series on nested internal components. It has a substantially cylindrical connector coupling ring 110 within which several components are nested and from which components may extend. A lanyard ring 130 is press fitted to the connector coupling ring 110 such that the lanyard ring 130 is free to rotate in relation to the connector coupling ring 110, to form housing 102, and extends above the connector coupling ring 110. The function of the lanyard ring 130 is to lock all components within the connector coupling ring together, as explained below. A portion of connector barrel 210 extends out below the connector coupling ring 110. (The connector barrel 210 is an exemplary embodiment of a "third component of a series of components," or a "first nested component for receiving a key," or a "first nested component," or a "third component" referenced elsewhere herein). As seen in FIGS. 2B-C, 3 and 4, a series of other components are also nested within housing 102. An internal coupling ring 170 (which is an exemplary embodiment of a "first component of a series of components" or a "second nested component," referenced elsewhere herein) that is coupled mechanically to the connector barrel 210 is also coupled mechanically to a communications insert body 152 that is nested within the lanyard ring 130. The communications insert body 152 may present an upper face 165 that may be supplied with sockets or pins (not shown).

Referring to FIG. 3 and FIG. 4, in particular, a circular wave spring 250 is seated with the connector coupling ring 110 and is interposed between the connector coupling ring 110 and a surrounding lip 194 of threaded segment 190 that is nested within the connector coupling ring 110. Thus, the threaded segment 190 seats on the wave spring 250 that is in turn seated on a circumferentially extending ledge 114 of connector coupling ring 110. As a result, the threaded segment 190 is capable of a limited range of reciprocating motion within the connector coupling ring 110 as the wave spring 250 is compressed or extended. The threaded segment 190 has small tabs 198 shown in FIG. 3 that register with and lock into cooperating slots (not shown) to fix threaded segment 190 rotationally relative to the internal coupling ring 110. Thus, when internal coupling ring 110 rotates, the threaded segment 190 and the wave spring 250 rotate in concert with it. The threaded segment 190 includes a series of teeth 192 that are resilient and able to move outward radially under outward urging forces applied from inside the threaded segment 190. The threading 196 spirals circumferentially around internal faces of the teeth 192, as shown in FIG. 4, to engage internal threading of another device (like receptacle 26 of FIG. 1A-B). The thread 196 of threaded segment 190 is effectively a female threading designed to receive a male thread 196A. When an appropriate force vector is applied to the lanyard ring 100, the teeth 192 of threaded segment 190 the spread outward under radial outward urging from the crowns, such as crown 197A and crown 197B, of male threads 196A. As a result, the male threaded device 192A is pulled free from the female thread 196 and the device is released without any or without significant damage to the threaded segment 190, or its teeth 192 or threads 196.

An internal coupling ring 170 is nested within the threaded segment 190, and is described in more detail below with reference to FIGS. 8A-D. A connector barrel 210, with a connector barrel body 212, nests within the internal coupling ring 170 and extends downward so that an end portion 214 extends below a lower extremity of the connector coupling ring 110. The connector barrel 210 is secured to the internal coupling ring 170 by a circular spring clip 290 that rests on an upper lip 216 of the connector barrel 210 and that cooperates with a circumferential slot 172 (see, FIG. 4) in an inner surface of internal coupling ring 170. The lanyard ring 130 has a ramped flange portion 135 that engages a groove 116 in the connector coupling ring 110. Thus, when the lanyard ring 130 is press fitted to the connector coupling ring 110, the lanyard ring 130 and the connector coupling ring 110 are free to rotate relative to each other and the assembled components described above, with the exception of the communications insert body 152, are substantially contained within the housing 102. An exemplary embodiment of the repairable lanyard release connector 100, assembled with the removable communications insert body 152, is shown in FIG. 2A.

Figure 6:
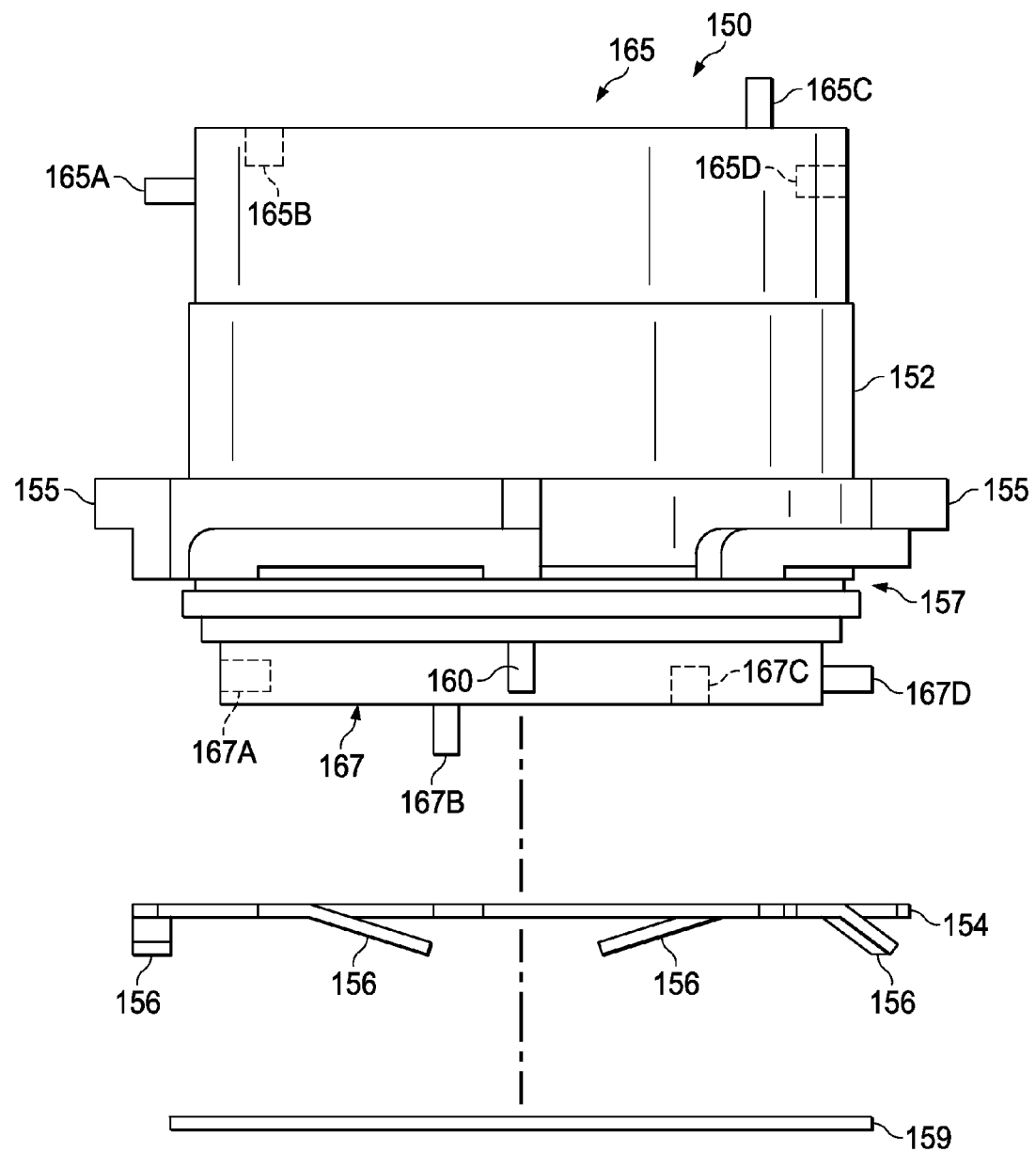
FIG. 6 is an exploded view of an exemplary embodiment of a communications insert for a lanyard release connector.
Figure 7:
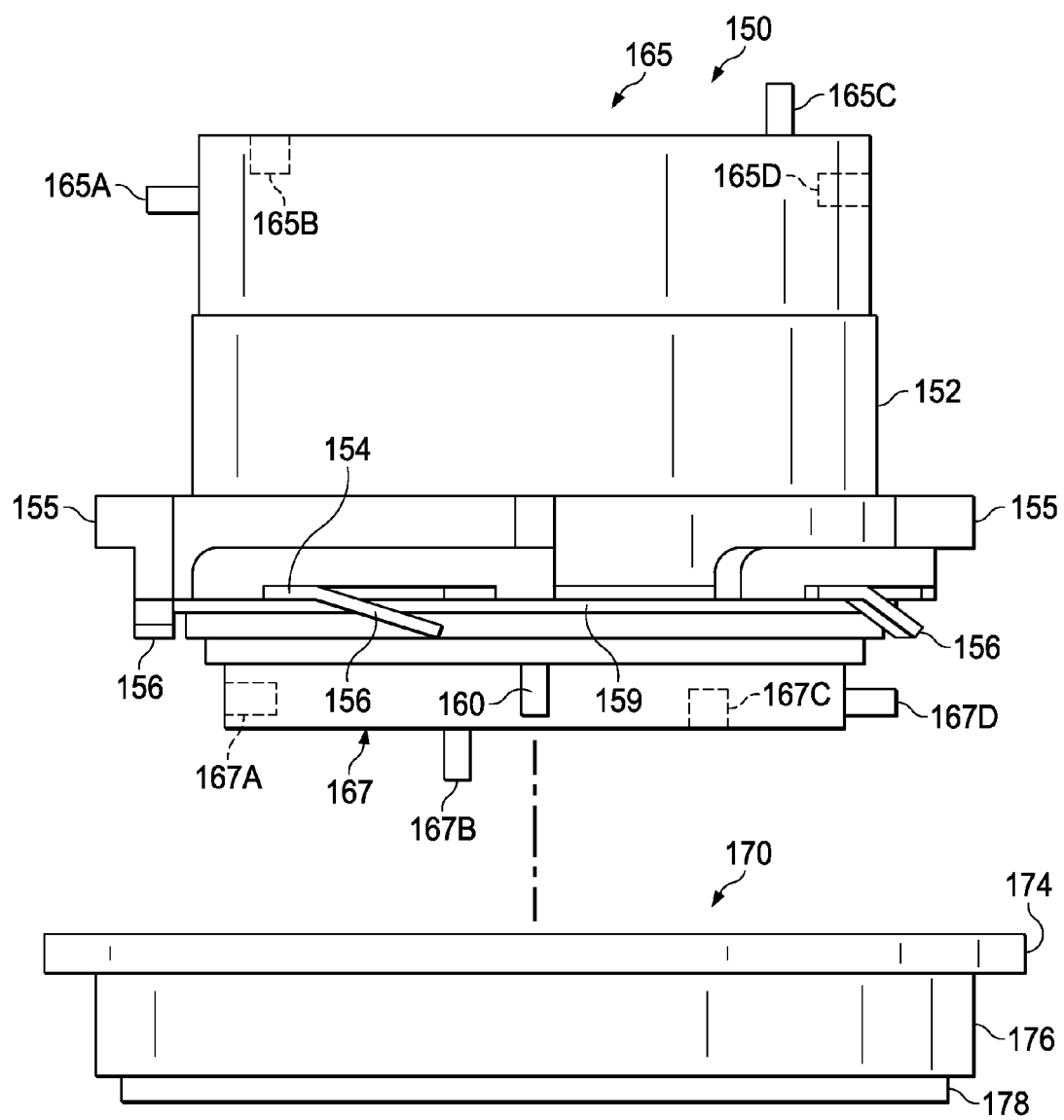
FIG. 7 is a side view of an exemplary embodiment of a communications insert for a lanyard release connector, showing insertion into an exemplary internal coupling ring.
Figure 8A:
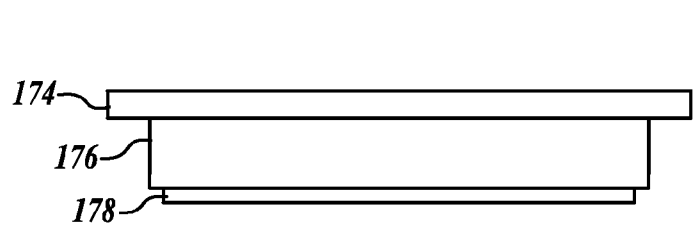
FIG. 8A is a side view of an exemplary embodiment of a internal coupling ring.
Figure 8B:
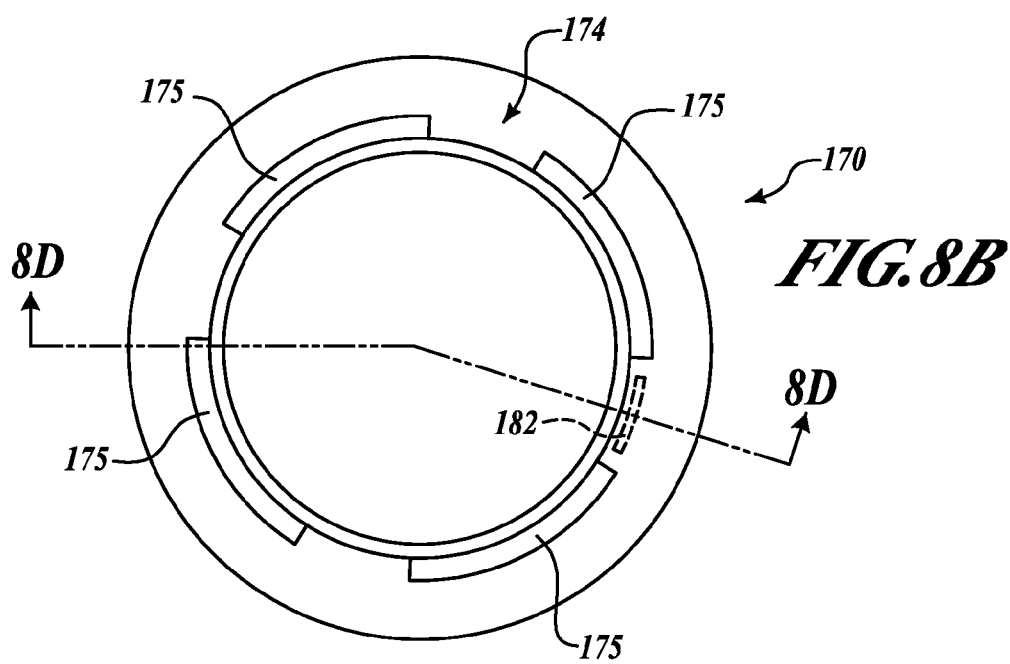
FIG. 8B is a top view of the internal coupling ring of FIG. 8A.
Figure 8C:
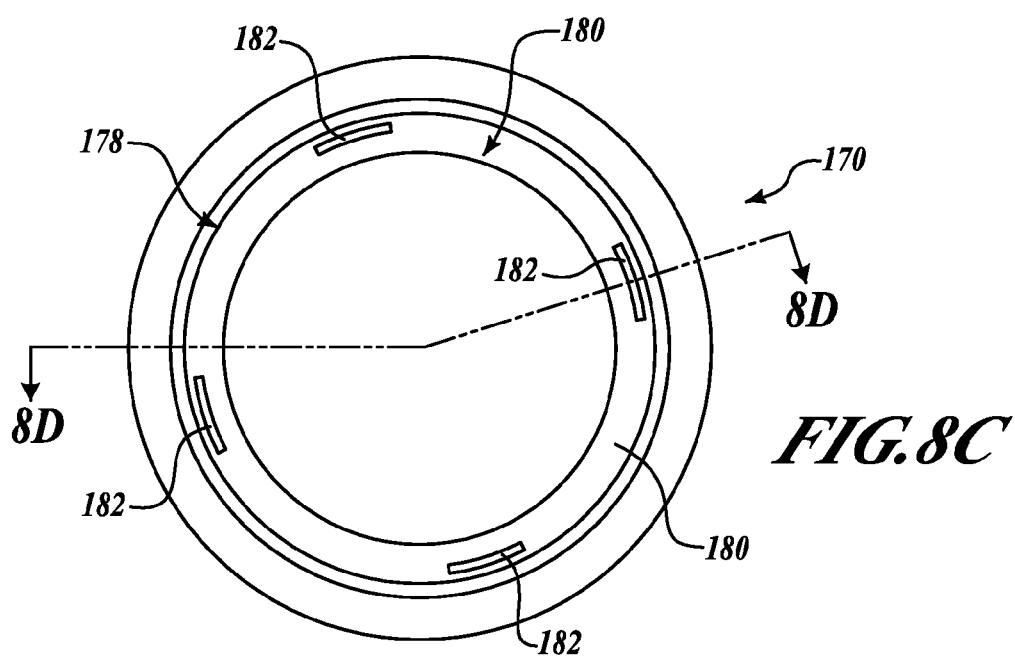
FIG. 8C is a bottom view of the internal coupling ring of FIG. 8A.
Figure 11A:
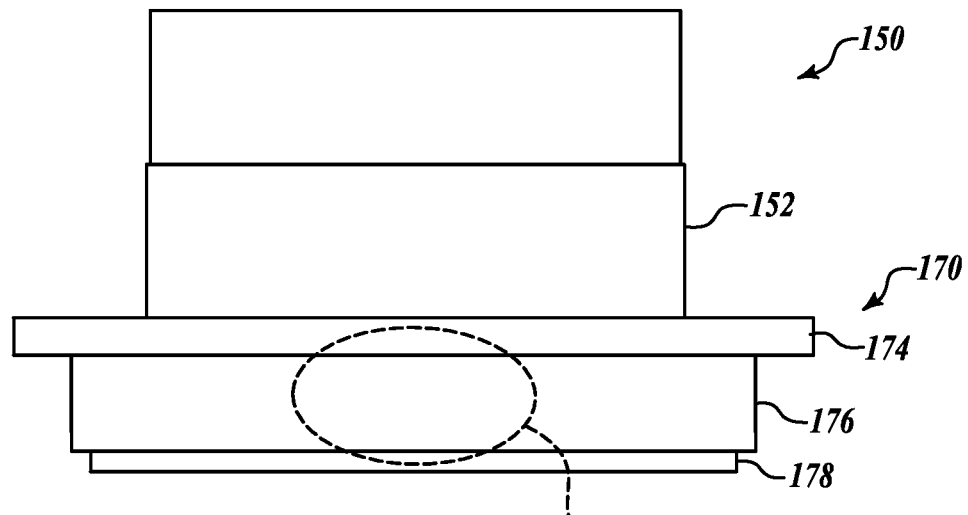
FIG. 11A is an illustration in side view of an exemplary embodiment of a communications insert coupled to an exemplary internal coupling ring.
Figure 11B:
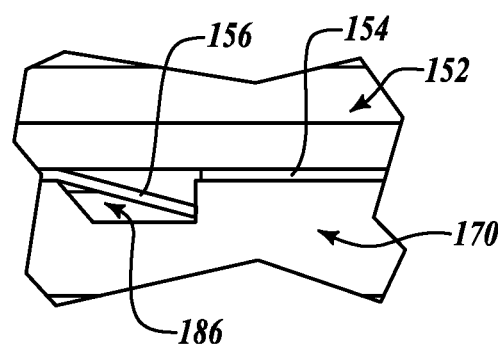
FIG. 11B is a cutaway of the portion depicted on FIG. 11A to depict internal detail.

An exemplary embodiment of a communications insert body 152 is illustrated in FIGS. 6 and 7. As can be seen, the communications insert 150 has a communications insert body 152, which is substantially cylindrical in this embodiment. The communications insert 150 includes a face 167 includes pins 167B or 167D, or sockets 167A or 167C, that register with and cooperate with a device (such as receptacle 26 of FIGS. 1A-B). The upper face 165 includes pins 165B or 165D, or sockets 165A or 165C, that register with and cooperate with an umbilical, not shown. Referring to FIGS. 4 and 6, the communications insert body 152 has a slot 157 extending around an outer circumference for receiving a circular internal coupling ring retention spring clip 154. This internal coupling ring retention spring clip 154 includes one or more outward projecting radially spaced apart resilient engaging prongs 156 configured to cooperate with an internal structure of the internal coupling ring 170. (Resilient engaging prongs 156 are exemplary embodiments of "first structure for releasably engaging," referenced elsewhere herein.) To prevent the communications insert from rotating independently from the internal coupling ring 170, the resilient engaging prongs 156 each lock resiliently into a internal cavity 186 of the internal coupling ring, as shown in FIG. 11B. (Internal cavity 186 is an example of a "first cooperating structure of a first component" referenced elsewhere herein.) A circular spring clip 159 secures the internal coupling ring retention spring clip 154 to the communications insert body 152. The assembled communications insert 150 can then be inserted into the internal coupling ring 170, as shown in FIG. 7, which is already in place in the replaceable assembly of FIG. 2A.

Figure 9A:
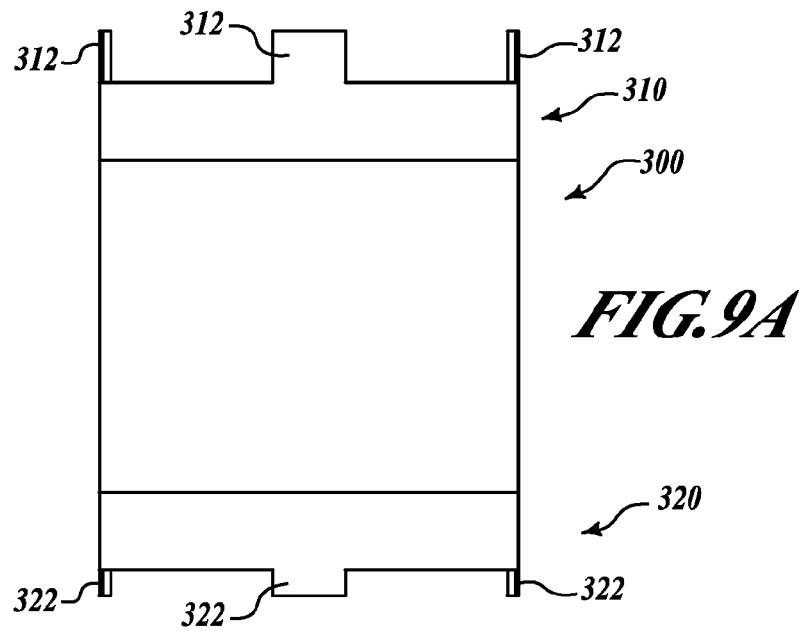
FIG. 9A is a side view of an exemplary embodiment of a communications insert installation and removal tool.
Figure 9B:
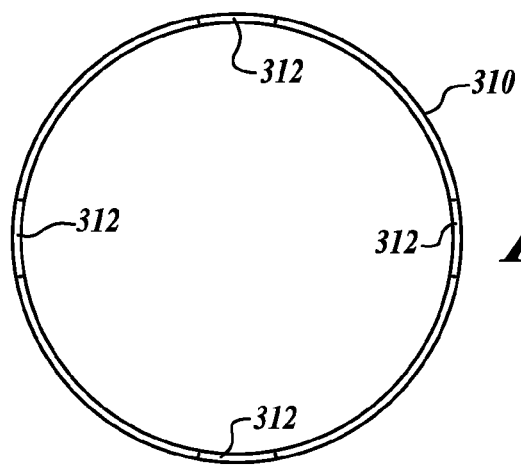
FIG. 9B is a top view of the embodiment of FIG. 9A.
Figure 9C:
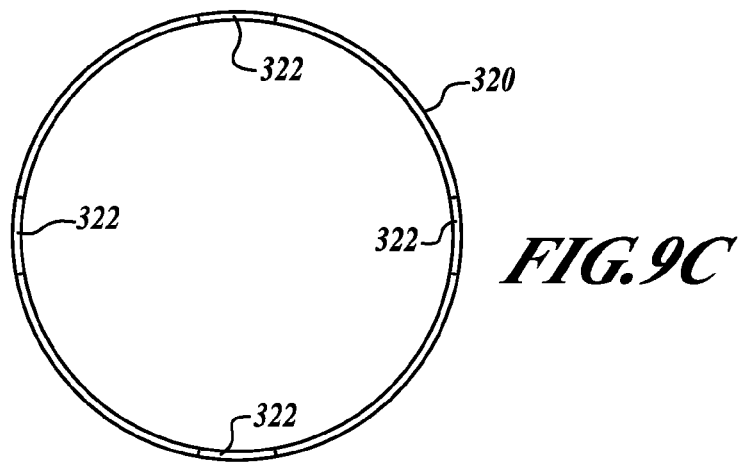
FIG. 9C is a bottom view of the embodiment of FIG. 9A.

In an exemplary embodiment, the communications insert body 152 is installed into the replaceable lanyard assembly 104 using an installation tool and removal 300, illustrated in FIGS. 9A-C. For brevity, this tool 300 will be referred to as an "installation tool", with the understanding that it also performs a communications insert removal function. The installation tool 300 has a cylindrical body sized for insertion into the internal coupling ring 170. Further, the installation tool 300 has a removal end 310 for adapted for removing the communications insert body from the replaceable lanyard release assembly 104, and an insertion end 320 adapted for installing the communications insert body 152 into the replaceable lanyard release assembly 104. In an exemplary embodiment, the installation and removal of the communications insert body 152 is based in structure of the internal coupling ring 170, an example of which is illustrated in FIGS. 8A-D. The illustrated internal coupling ring 170 has a cylindrical body 176 with an upper circular face 174 and a cylindrical base 178 of smaller circumference that the cylindrical body 176, with a lower face 180. A series of spaced apart coupling ring release slots 182 extend circumferentially on the lower face 180 of the base 178. These slots 182 each extend into a cavity 186 located vertically above the slot, as shown in the cross sectional view in FIG. 8D. These spaced apart internal cavities 186 in the inner wall are configured to receive the resilient engaging prongs 156 of the internal coupling ring retention spring clip 154 via their respective downward extending slots 182.

The installation tool 300 has series of short spaced apart tabs 322 extending circumferentially around the perimeter of the insertion end 320. These short tabs 322 are sized to enter into the slots 182 in the cylindrical base 178 of the internal coupling ring 170 but do not extend for a sufficiently far into the base 178 to enter into cavities 186 of internal coupling ring 170. Thus the short tabs 322 do not apply pressure to resilient engaging prongs 156 in the cavities 186. Further, at the removal end 310, the installation tool 300 has longer spaced apart tabs 312 extending circumferentially around the perimeter. These tabs 312 are sufficiently long to enter through slots 182 into cavities 186 of internal coupling ring 170 and to apply urging pressure to resilient engaging prongs 156 in the cavities 186. This urging pressure releases the resilient engaging prongs 156 from their cavities 186 allowing the internal coupling ring 170 to rotate freely relative to the communications insert body 152.

Figure 10:
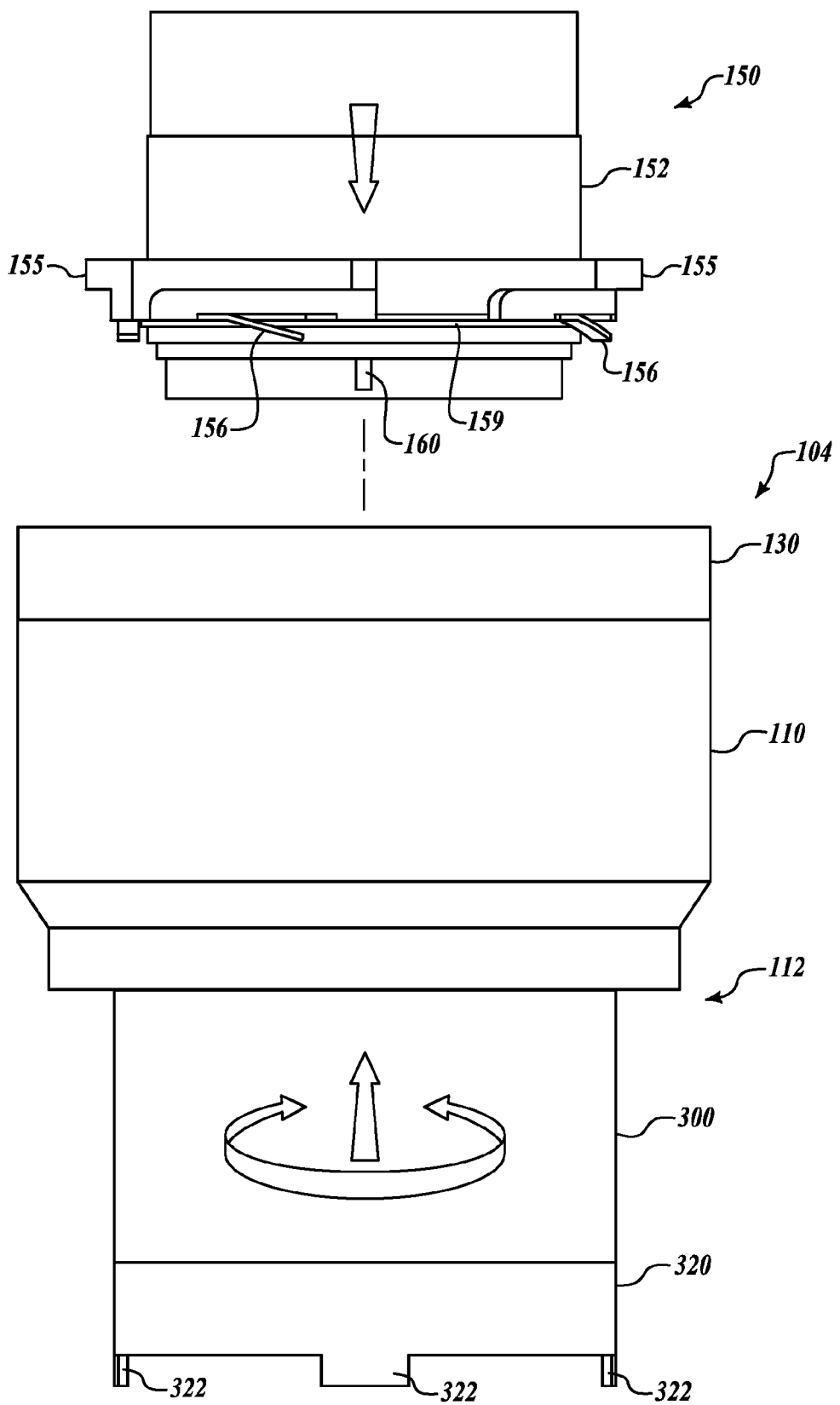
FIG. 10 is a side view illustration depicting an exemplary embodiment of an installation and removal tool inserted into an exemplary replaceable lanyard assembly, and a communications insert being inserted into the replaceable lanyard assembly.

To install the communications insert body 152, as illustrated in FIG. 10, the insert end 320 of installation tool 300 is inserted into the base 112 of the connector coupling ring 110, so that the short tabs 322 register with and enter the slots 182 in the cylindrical base 178 of the internal coupling ring 170. The communications insert body 152 is inserted into the internal coupling ring 170, so that outward projecting teeth 155 (see FIG. 2B) register with internal coupling ring upper face slots 175. (The projecting teeth 155 are exemplary embodiments of "second structure for releasably engaging second structure of a first component of a series of components," referenced elsewhere herein.) During this insertion, the key 160 on the communications insert body 152 must be aligned with the slot 215 in the interior of connector barrel 210. (Key 160 is an exemplary embodiment of "third structure of the communications insert body," referenced elsewhere herein.) This fixes the relationship between the orientation of electrical contacts in the opposed faces 165, 167 of the communications insert body 152 and the key slot 215 on the connector barrel 210. (Key slot 215 is an exemplary embodiment of a "third cooperating structure of a third component of a series of components," referenced elsewhere herein.) The communications insert body 152 is locked in position relative to the connector barrel 210 at this point. Then, the installation tool 300 is rotated 90 degrees. This 90 degree rotation facilitates the projecting teeth 155 sliding in upper face slots 175 to enter adjacent slots 177 of the internal coupling ring 170. (The slots 177 are exemplary embodiments of "second structure of a first component of a series of components," referenced elsewhere herein.) The rotation through 90 degrees causes the internal coupling ring 170 to rotate in relation to the communications insert body 152. The rotation permits the resilient engaging prongs 156 to clip into the spaced apart internal cavities 186 in the inner wall of internal coupling ring 170, as shown in FIG. 11B, for example. The rotation also traps the projecting teeth 155 in adjacent slots 177 thereby preventing reciprocating movement of the communications insert body 152 relative to the internal coupling ring 170. FIG. 4 best illustrates the projecting teeth 155 within adjacent slots 177 of the internal coupling ring 170. As explained above, the connector barrel 210 is affixed to the internal coupling ring 170 by a spring clip 290. The communications insert body 152 is held in the internal coupling ring by the resilient engaging prongs 156 that restrict rotational movement of the communications insert body 152 and the projecting teeth 155 that restrict reciprocating motion of the communications insert body relative to the internal coupling ring 170. Thus, the communications insert body 152 is installed into the replaceable connector assembly 104.

Figure 12A:
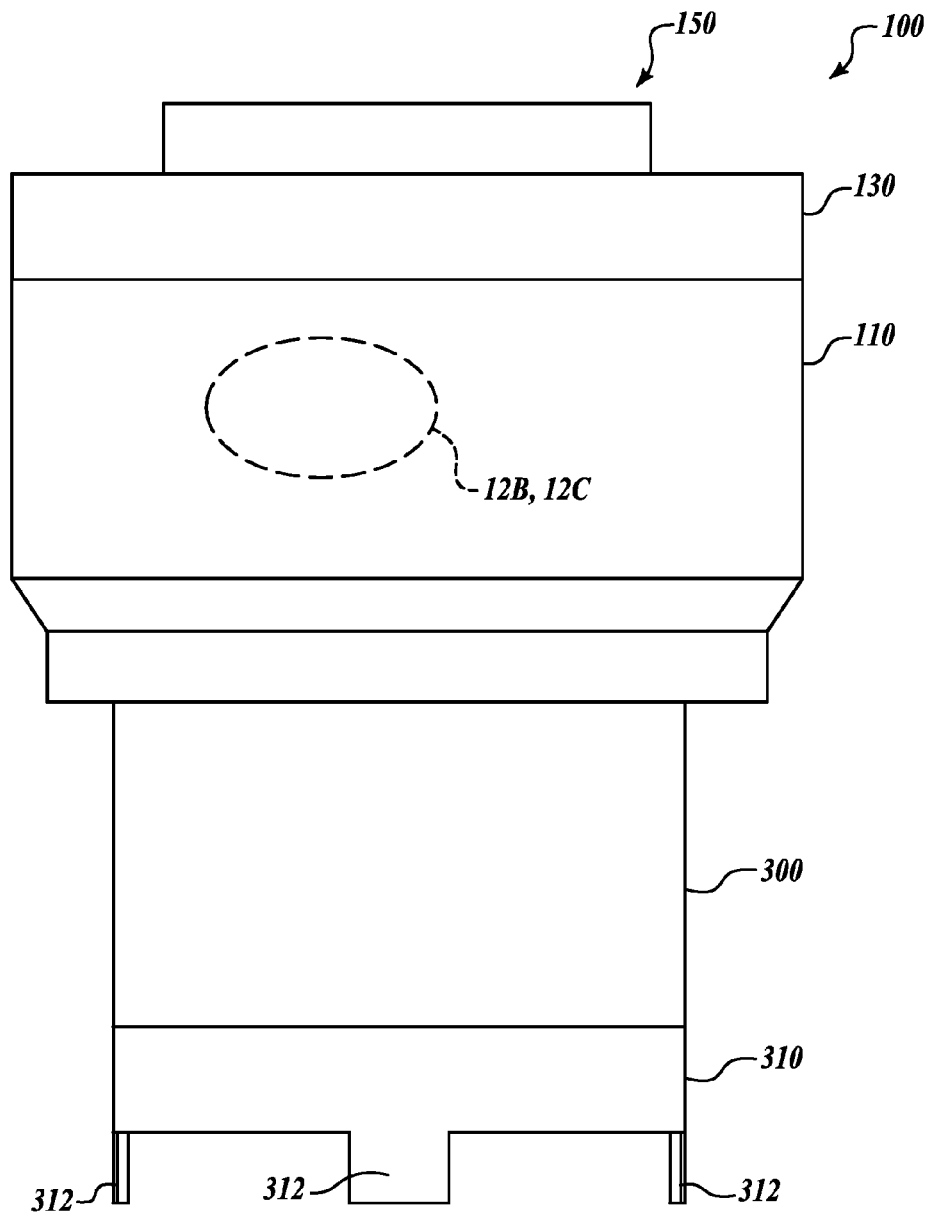
FIG. 12A is an exemplary embodiment of a repairable lanyard release connector with an exemplary installation and removal tool inserted.
Figure 12B:
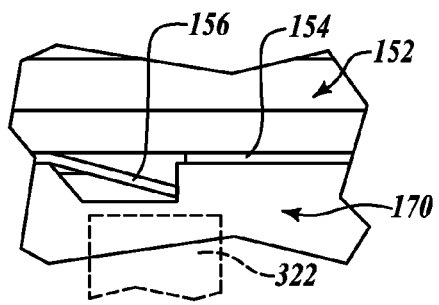
FIG. 12B is a cutaway view of a portion of the embodiment of FIG. 12A illustrating detail when the communications insert is locked to the internal coupling ring.
Figure 12C:
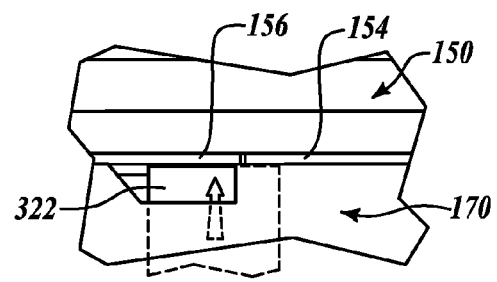
FIG. 12C is a cutaway view of a portion of the embodiment of FIG. 12A illustrating detail when the installation tool releases the communications insert from the internal coupling ring.

To remove the communications insert body 152, the removal end 310 of tool 300, with longer tabs 312, is inserted into the connector coupling ring 110. Referring to FIGS. 12A C, the longer tabs 312 align with and enter slots 182. As the installation tool 300 is urged into the lanyard release connector 100, the longer tabs 312 each enter its respective spaced apart internal cavity 186 in the inner wall of internal coupling ring 170. The advancing tabs 312 compress the engaging prongs 156 of the internal coupling ring retention spring clip 154. The tool 300 may then be rotated 90 degrees to slide the projecting teeth 155 from the adjacent slots 177 and there by separate the communications insert body 152 from the replaceable assembly. The key 160 of the communications insert body 152 may be removed from key slot 215 of connector barrel 210.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A lanyard release connector comprising:
   a connector assembly comprising a housing, the housing comprising a series of nested components; and
   a communications insert body configured to nest within the housing, the communications insert body comprising:
      a first structure configured to releasably engage a first cooperating structure of a first component of the series of nested components so that the communications insert body and the first component rotate in concert when one is rotated, wherein the first structure comprises a spring clip in the form of a circle having two parallel planar surfaces, wherein at least one resilient prong extends from one of the planar surfaces and the first cooperating structure comprises a cavity within the first component; and
      a second structure configured to releasably engage a second cooperating structure of the first component of the series of nested components to limit a reciprocating motion of the communications insert body in the connector assembly.

2. The lanyard release connector of claim 1, wherein a slot extends from the cavity, the slot configured to receive a tab of a tool and to guide the tab into the cavity to compress the resilient prong of the spring clip.

3. The lanyard release connector of claim 1, wherein the second structure comprises a projecting tooth of the communications insert body, and the second cooperating structure comprises a slot configured to slidingly receive the projecting tooth.

4. The lanyard release connector of claim 1, further comprising a third structure of the communications insert body configured to engage a third cooperating structure of a third component of the series of nested components, so that during rotation, the third component rotates in concert with the communications insert body.

5. The lanyard release connector of claim 4, wherein the third structure comprises a key, and the third cooperating structure comprises a key slot.

6. The lanyard release connector of claim 1, wherein the housing comprises a cylindrical coupling ring press fitted to a locking ring.

7. A lanyard release connector comprising:
   a connector assembly comprising a housing, the housing comprising a series of nested components; and
   a communications insert body configured to nest within the housing, the communications insert body comprising:
      a first structure configured to releasably engage a first cooperating structure of a first component of the series of nested components so that the communications insert body and the first component rotate in concert when one is rotated; and
      a second structure configured to releasably engage a second cooperating structure of the first component of the series of nested components to limit a reciprocating motion of the communications insert body in the connector assembly; and
   a threaded nested component nested within the housing, the threaded nested component comprising a threaded region that is outwardly resilient, under urging, from a crown of a threaded device when a force is applied to urge the threaded nested component from the threaded device.

8. The lanyard release connector of claim 7, wherein the threaded nested component comprises a third structure configured to engage a complimentary structure of the first component so that the threaded nested component and the first component rotate in concert.

9. A lanyard release connector comprising:
a connector assembly comprising a cylindrical housing, the housing comprising:
  a first nested component comprising a key slot;
  a second nested component mechanically coupled to the first nested component, the second nested component comprising at least one cavity; and
a communications insert body configured to nest within the housing, the communications insert body comprising:
  a key configured to releasably engage the key slot of the first nested component so that the communications insert body and the first nested component rotate in concert when one is rotated;
  a spring clip in the form of a circle having two parallel planar surfaces, wherein at least one resilient prong extends from one of the planar surfaces which is releasably engaged in the at least one cavity of the second nested component; and
  a projecting tooth configured to engage a structure of the second nested component to limit or prevent a reciprocating motion of the communications insert body within the second nested component.

* * * * *